(12) United States Patent
Yu

(10) Patent No.: US 9,770,735 B2
(45) Date of Patent: Sep. 26, 2017

(54) SEAL AGENT COATING DEVICE

(71) Applicants: BOE TECHNOLOGY GROUP CO., LTD., Beijing (CN); HEFEI BOE OPTOELECTRONICS TECHNOLOGY CO., LTD., Hefei, Anhui Province (CN)

(72) Inventor: Feng Yu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui Province (CN)

( * ) Notice: Subject to any disclaimer, the term of this patent is extended or adjusted under 35 U.S.C. 154(b) by 42 days.

(21) Appl. No.: 14/800,542

(22) Filed: Jul. 15, 2015

(65) Prior Publication Data
US 2016/0271628 A1   Sep. 22, 2016

(30) Foreign Application Priority Data

Mar. 20, 2015   (CN) .......................... 2015 1 0125491

(51) Int. Cl.
| B05C 5/00 | (2006.01) |
| B05B 7/16 | (2006.01) |
| B05C 5/02 | (2006.01) |
| G02F 1/1339 | (2006.01) |

(52) U.S. Cl.
CPC .......... B05C 5/0266 (2013.01); B05B 7/1613 (2013.01); B05C 5/001 (2013.01); B05C 5/0212 (2013.01); B05C 5/0262 (2013.01); B05C 5/004 (2013.01); G02F 1/1339 (2013.01)

(58) Field of Classification Search
CPC ...................................................... B05B 1/005

USPC ................ 118/300, 302; 222/309, 389
See application file for complete search history.

(56) References Cited

U.S. PATENT DOCUMENTS 5,171,613 A * 12/1992 Bok ...................... B01F 5/0619
                                                                118/667
2013/0177702 A1* 7/2013 Crouch .................... B41J 2/045
                                                                427/98.4

FOREIGN PATENT DOCUMENTS

| CN | 202083864 U | 12/2011 |
| CN | 202120014 U | 1/2012 |
| CN | 202600312 U | 12/2012 |
| CN | 103056064 A | 4/2013 |
| CN | 103353691 A | 10/2013 |

OTHER PUBLICATIONS

Abstracted Pub KR 2005122994 A, Dec. 29, 2005.*
Office Action in Chinese Application No. 201510125491.7 dated Mar. 16, 2017, with English translation. 8 pags.

* cited by examiner

*Primary Examiner* — Yewebdar Tadesse
(74) *Attorney, Agent, or Firm* — Blakely Sokoloff Taylor & Zafman LLP

(57) ABSTRACT

A seal agent coating device is disclosed, comprising: a storage cavity, a nozzle, a connecting duct and a power driven component, wherein: the nozzle comprises a nozzle cavity and a mouth, the mouth being located at the lower part of the nozzle cavity and matching with the shape of the seal agent coating area of the substrate; the connecting duct interconnects the storage cavity and the nozzle cavity; the power driven component can squeeze the seal agent in the storage cavity into the nozzle cavity via the connecting duct, thereby squeezing it out via the mouth.

18 Claims, 4 Drawing Sheets

SEAL AGENT COATING DEVICE

RELATED APPLICATIONS

The present application claims the benefit of Chinese Patent Application No. 201510125491.7, filed on Mar. 20, 2015, the entire disclosure of which is incorporated herein by reference.

TECHNICAL FIELD

The disclosure relates to the field of manufacture technology of a display device, particularly to a seal agent coating device.

BACKGROUND ART

The liquid crystal panel of the thin film transistor liquid crystal display (TFT-LCD) mainly includes: a color film substrate and an array substrate arranged in box alignment, and a liquid crystal layer filled between the color film substrate and the array substrate.

The process of box aligning the color film substrate and the array substrate that are prepared in advance is called "box aligning process", the process there of is: dripping liquid crystals in the display area of one substrate, coating the seal agent uniformly on the peripheral area of the other substrate using a seal agent coating device; after the above steps are finished, box aligning the two substrates, and curing the seal agent so as to realize joint of the two substrates.

As shown in FIG. 1, which is a structural schematic view of an existing seal agent coating device, comprising: a storage cavity 2 for storing the seal agent; a gas outlet 1 arranged above the storage cavity 2 and connected with the storage cavity 2, a nozzle 3 arranged under the storage cavity 2 and connected with the storage cavity 2 through a conduit 4. When coating the seal agent, the seal agent is filled in the storage cavity 2 firstly; then, gas is charged into the storage cavity 2 through the gas outlet 1, due to the effect of the air pressure, the seal agent is squeezed, and moves downwards along the inner wall of the storage cavity 2, so as to be ejected outward through the nozzle 3, here, the position on the substrate that needs to be coated with the seal agent is exactly transported to the lower part of the nozzle 3 by a transport device, so as to enable the seal agent to be coated on the corresponding position of the substrate.

The defect of the above prior art lies in that the process time is relatively long and the efficiency is not high by using the existing seal agent coating device to coat the seal agent; moreover, in order to enable the seal agent to form a closed loop, the start end and the finish end need to be overlapped partly, which may cause the seal agent coating at this position to be over thick, thereby resulting in relatively bad uniformity of the thickness of the seal agent.

SUMMARY OF THE DISCLOSURE

The object of the embodiment of this disclosure is to provide a seal agent coating device, so as to shorten the process time of seal agent coating, improve the coating efficiency and improve uniformity of the thickness of the seal agent coating.

The embodiment of this disclosure provides a seal agent coating device, comprising: a storage cavity, a nozzle, a connecting duct and a power driven component, wherein: the nozzle comprises a nozzle cavity and a mouth, the mouth being located at the lower part of the nozzle cavity and matching with the shape of the seal agent coating area of the substrate; the connecting duct interconnects the storage cavity and the nozzle cavity; the power driven component can squeeze the seal agent in the storage cavity into the nozzle cavity via the connecting duct, thereby squeezing it out via the mouth.

In the technical solution of the embodiment of this disclosure, the mouth of the nozzle matches with the shape of the seal agent coating area, when the power driven component drives the seal agent to be squeezed out from the mouth, the seal agent can be integrally coated on the seal agent coating area of the substrate, compared with the prior art, this solution significantly shortens the process time of the seal agent coating and improves the coating efficiency. In addition, since the seal agent is integrally coated, there will not be the start end and the finish end of the coating, thus, the coating overlapping can be avoided, thereby improving uniformity of the thickness of the seal agent coating.

Preferably, the connecting duct comprises an upper duct and a lower duct, the upper duct is connected with the storage cavity, the lower duct is connected with the nozzle cavity, the upper duct and the lower duct are detachably connected through a fastener. When the coating size of the seal agent needs to be changed, the upper duct and the lower duct can be detached, and then it is replaced with a nozzle and a lower duct of the appropriate size, since the components such as the storage cavity and the upper duct do not have to be replaced, this solution can save the device cost.

Preferably, the lower duct comprises several branch ducts respectively connected with the nozzle cavity. The seal agent can be introduced into the nozzle cavity quickly and uniformly through several branch ducts, which is favorable for improving the coating efficiency further.

Preferably, the branch ducts are horizontally or obliquely arranged.

Preferably, an on-off valve is arranged on at least one of the branch ducts. By controlling on and off of the on-off valve, the circulation route of the seal agent can be selected, thereby controlling the squeezing speed of the seal agent better and improve the coating efficiency.

Preferably, the nozzle is a frame shaped nozzle, at least one pair of opposite frame borders of the frame shaped nozzle are length adjustable frame borders. By adjusting the frame border length of the frame shaped nozzle, the seal agent coating device can be adapted for seal agent coating on substrates of different sizes, the application range is relatively wide, which can save the device cost greatly.

Preferably, the length adjustable frame border comprises a first frame border portion, a second frame border portion and a transitional connecting portion, the first frame border portion and the second frame border portion are telescopically connected with two ends of the transitional connecting portion respectively, or the length adjustable frame border comprises a first frame border portion and a second frame border portion, the first frame border portion is telescopically connected with the second frame border portion.

Preferably, the exterior of the nozzle cavity is configured with a heating muff. The heating muff can heat the seal agent within the nozzle cavity, thereby reducing the viscosity of the seal agent, increasing fluidity of the seal agent, and being favorable for rupture of residual bubbles in the seal agent. The use of the design of this solution can reduce the phenomenon of kisscoating and breakcoating in the process of seal agent coating, thereby ensuring the coating quality.

Preferably, the nozzle has a shrink mouth structure, the sectional shape of the nozzle cavity comprises an inverted triangle or an inverted peach shape.

Preferably, the power driven component comprises a piston arranged in the storage cavity, or, the power driven component comprises a charging pipe for charging gas into the cavity part of the storage cavity.

REFERENCE SIGNS

The Prior Art Part

1—gas outlet; 2—storage cavity; 3—nozzle; 4—conduit

The Embodiment Part of this Disclosure

11—storage cavity; 12—nozzle; 13—connecting duct; 14—fastener; 15—on-off valve; 16—heating muff; 17—piston; 121—nozzle cavity; 122—mouth; 131—upper duct; 132—lower duct; 1321—branch duct; 12a—first frame border portion; 12b—second frame border portion; 12c—transitional connecting portion.

DETAILED DESCRIPTION OF THE DISCLOSURE

In order to shorten the process time of the seal agent coating, increase the coating efficiency and improve the uniformity of the thickness of the seal agent coating, the embodiment of this disclosure provides a seal agent coating device. In order to make the purposes, the technical solutions and the advantages of this disclosure clearer, this disclosure will be further explained in detail with the embodiments as follows.

Figure 1:
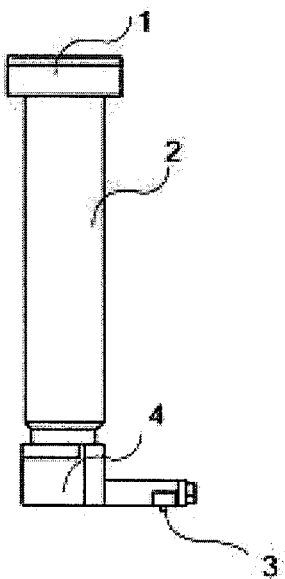
FIG. 1 is a structural schematic view of a seal agent coating device in the prior art.
Figure 2:
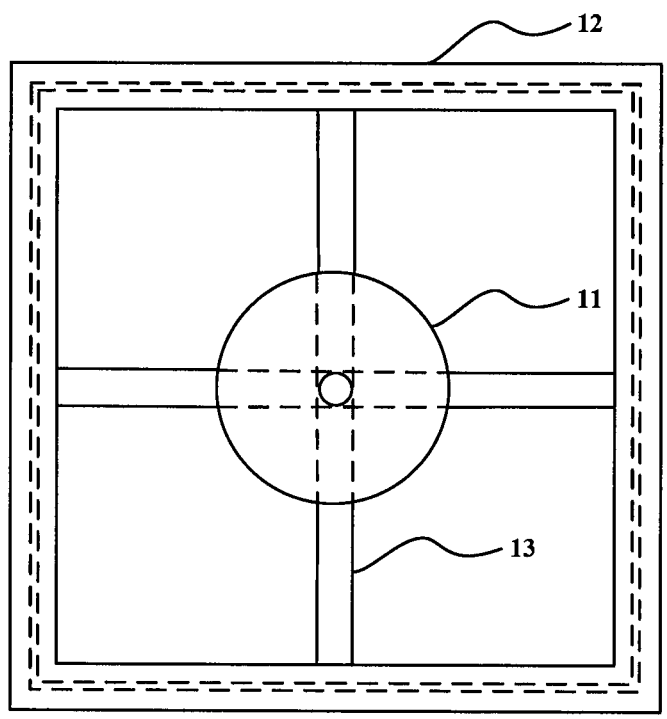
FIG. 2 is a vertical structural schematic view of a seal agent coating device of a first embodiment of this disclosure.
Figure 3:
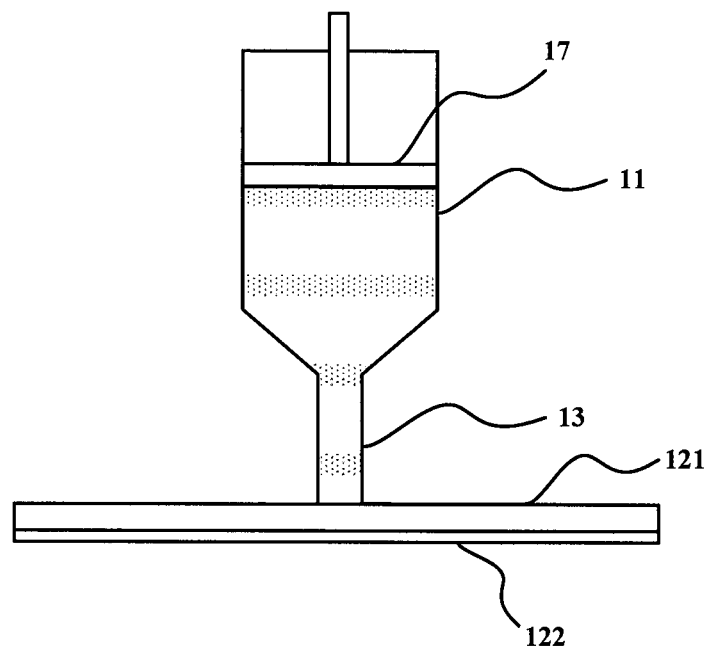
FIG. 3 is a front structural schematic view of a seal agent coating device of a first embodiment of this disclosure.

As shown in FIG. 2 and FIG. 3, the seal agent coating device provided by an embodiment of this disclosure comprises a storage cavity 11, a nozzle 12, a connecting duct 13 and a power driven component, wherein:

the nozzle 12 comprises a nozzle cavity 121 and a mouth 122, the mouth 122 being located at the lower part of the nozzle cavity 121 and matching with the shape of the seal agent coating area of the substrate; the connecting duct 13 interconnects the storage cavity 11 and the nozzle cavity 121; the power driven component can squeeze the seal agent in the storage cavity 11 into the nozzle cavity 121 via the connecting duct 13, thereby squeezing it out via the mouth 122.

In the embodiment of this disclosure, "the mouth 122 matching with the shape of the seal agent coating area of the substrate" can be understood as: within certain error range, the distribution shape of the mouth 122 is same as the shape of the seal agent coating area of the substrate, the opening width of the mouth 122 is equal to the coating width of the seal agent.

The seal agent coating device can be installed on a seal agent coating machine, specifically, the storage cavity 11 is fixed on a connecting plate, the connecting plate is fixedly connected with a related structure member of the seal agent coating machine, thereby realizing installation of the seal agent coating device.

The specific shape of the nozzle 12 is not limited, however, preferably, the nozzle 12 has a shrink mouth structure, the sectional shape of the nozzle cavity 121 may be an inverted triangle or an inverted peach shape etc., the mouth 122 is located at the lowest part of the nozzle cavity 121.

The specific type of the power driven component is not limited, for example, as shown in FIG. 3, the power driven component comprises a piston 17 arranged in the storage cavity 11. In other embodiments of this disclosure, the power driven component may also comprise a charging pipe for charging gas into the cavity part of the storage cavity.

In the technical solution of the embodiment of this disclosure, the mouth 122 of the nozzle 12 matches with the shape of the seal agent coating area of the substrate, when the power driven component drives the seal agent to flow into the connecting duct 13 and the nozzle cavity 121 and finally squeeze out from the mouth 122, the seal agent can be integrally coated on the seal agent coating area of the substrate (i.e.: the seal agent coating area on the substrate is coated with seal agent simultaneously), compared with the prior art, this solution significantly shortens the process time of the seal agent coating and improves the coating efficiency. In addition, since the seal agent is integrally coated so as to form a closed loop, there will not be the start end and the finish end of the coating, thus, the coating overlapping can be avoided, thereby improving uniformity of the thickness of the seal agent coating.

In the embodiment of this disclosure, the specific design form of the connecting duct 13 is not limited, as long as it can interconnect the storage cavity 11 and the nozzle cavity 121, the above beneficial effect can be achieved.

Figure 4:
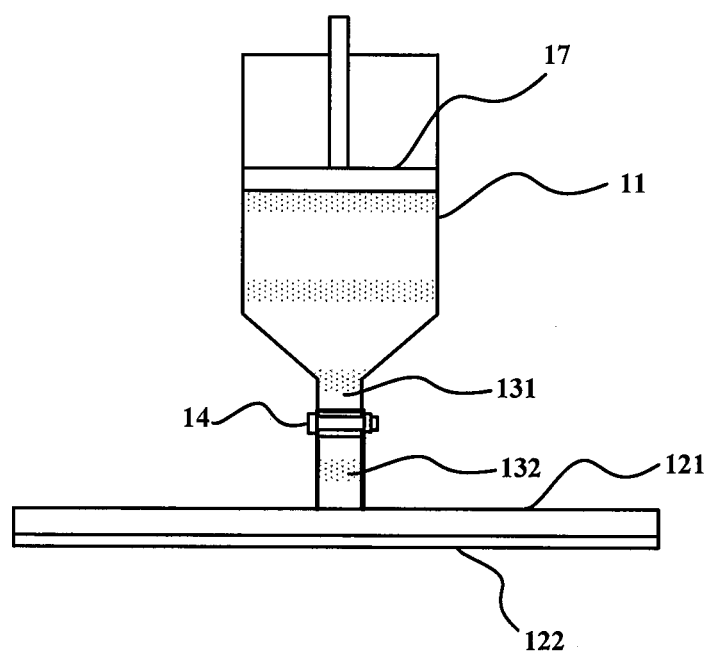
FIG. 4 is a front structural schematic view of a seal agent coating device of a second embodiment of this disclosure.

As shown in FIG. 4, in this embodiment, the connecting duct comprises an upper duct 131 and a lower duct 132, the upper duct 131 is connected with the storage cavity 11, the lower duct 132 is connected with the nozzle cavity 121, the upper duct 131 and the lower duct 132 are detachably connected through a fastener 14. The fastener 14 may adopt a bolt, when the coating size of the seal agent needs to be changed, the upper duct 131 and the lower duct 132 can be detached, and then it is replaced with a nozzle 12 and a lower duct 132 of the appropriate size, since the components such as the storage cavity 11 and the upper duct 131 do not have to be replaced, this solution can save the device cost.

Figure 5:
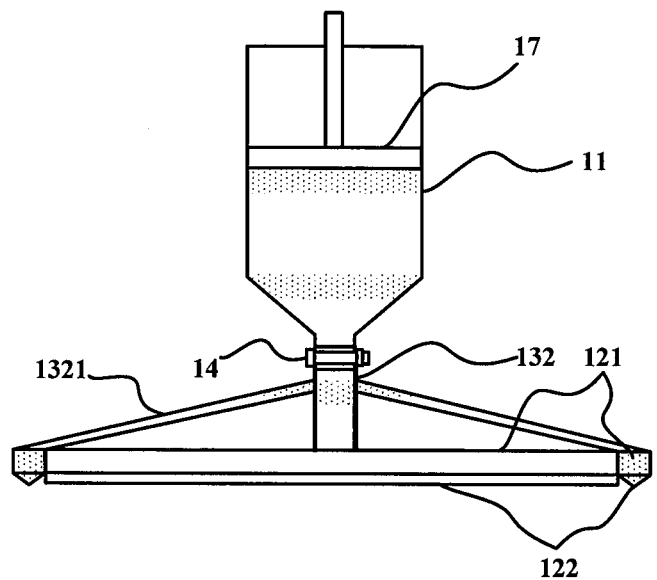
FIG. 5 is a front structural schematic view of a seal agent coating device of a third embodiment of this disclosure.

As shown in FIG. 5, in this embodiment, the lower duct 132 comprises several branch ducts 1321 connected with the nozzle cavity 121 respectively. The seal agent can be introduced into the nozzle cavity 121 quickly and uniformly through several branch ducts 1321, which is favorable for improving the coating efficiency further. The amount, the diameter and the setting manner of the branch duct 1321 can be determined based on the parameters such as the seal agent coating size, the seal agent coating amount etc.

As shown in FIG. 3, in this embodiment, the respective branch ducts are horizontally arranged (due to the view angle, it is not shown in the figure). As shown in FIG. 5, in this embodiment, four branch ducts are horizontally arranged (due to the view angle, it is not shown in the figure), two branch ducts 1321 are obliquely arranged.

Since the substrate is generally a rectangle, the seal agent coating area on the substrate is a rectangular frame, correspondingly, the nozzle 12 designed in the embodiment of this disclosure is also a frame shaped nozzle. Preferably, one or two pairs of opposite frame borders of the frame shaped nozzle are length adjustable frame borders. By adjusting the frame border length of the frame shaped nozzle, the seal agent coating device can be adapted for seal agent coating on substrates of different sizes, the application range is relatively wide, which can save the device cost greatly.

Figure 6:
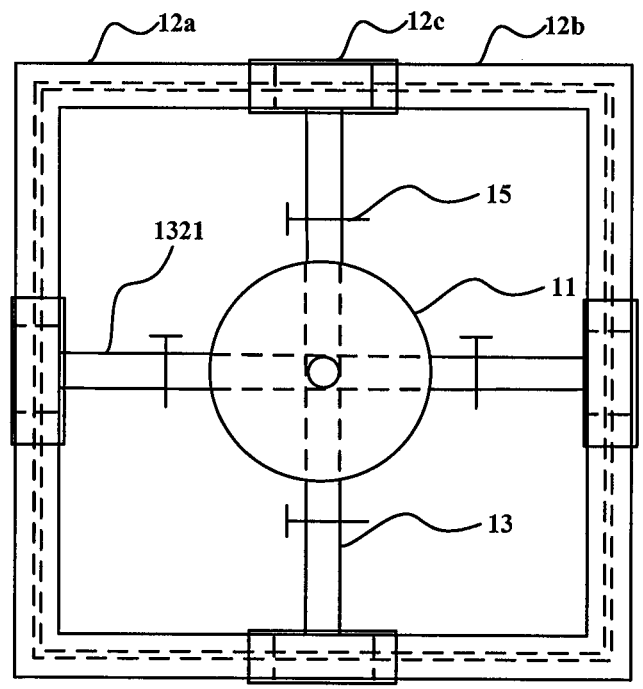
FIG. 6 is a vertical structural schematic view of a seal agent coating device of a fourth embodiment of this disclosure.

As shown in FIG. 6, in this embodiment, the length adjustable frame border comprises: a first frame border portion 12a, a second frame border portion 12b and a transitional connecting portion 12c, the first frame border portion 12a and the second frame border portion 12b are telescopically connected with two ends of the transitional connecting portion 12c respectively. When the length of the frame border needs to be increased, the first frame border portion 12a and/or the second frame border portion 12b are enabled to extend from the set length of the transitional connecting portion 12c; when the length of the frame border needs to be reduced, the first frame border portion 12a and/or the second frame border portion 12b are enabled to retract to the set length of the transitional connecting portion 12c. It shows that this design is applicable in seal agent coating on substrates of various sizes, which does not have to replace the nozzle and the lower duct.

It is worth mentioning that the length adjustable frame border structure is not limited to the above embodiment. In another embodiment of this disclosure, the length adjustable frame border may also comprise a first frame border portion and a second frame border portion, the first frame border portion is telescopically connected with the second frame border portion. Similar as the principle of the above embodiment, when the the length of the frame border needs to be increased, the first frame border portion is enabled to extend from the set length of the second frame border portion; when the length of the frame border needs to be reduced, the first frame border portion is enabled to retract to the set length of the second frame border portion. It shows that this design is also applicable in seal agent coating on substrates of various sizes, which does not have to replace the nozzle and the lower duct.

As shown in FIG. 6, in this embodiment, an on-off valve 15 is arranged on at least one of the branch ducts 1321. By controlling on and off of the on-off valve 15, the circulation route of the seal agent can be selected, thereby controlling the squeezing speed of the seal agent better and improve the coating efficiency. Particularly with respect to a nozzle with length adjustable frame borders, by using this design, the circulation route of the seal agent can be selected based on the seal agent coating amount and coating speed requirements of substrates of different sizes, for example, with respect to a substrate of a large size, all the on-off valves are opened; with respect to a substrate of a small size, some of the on-off valves are closed selectively.

Figure 7:
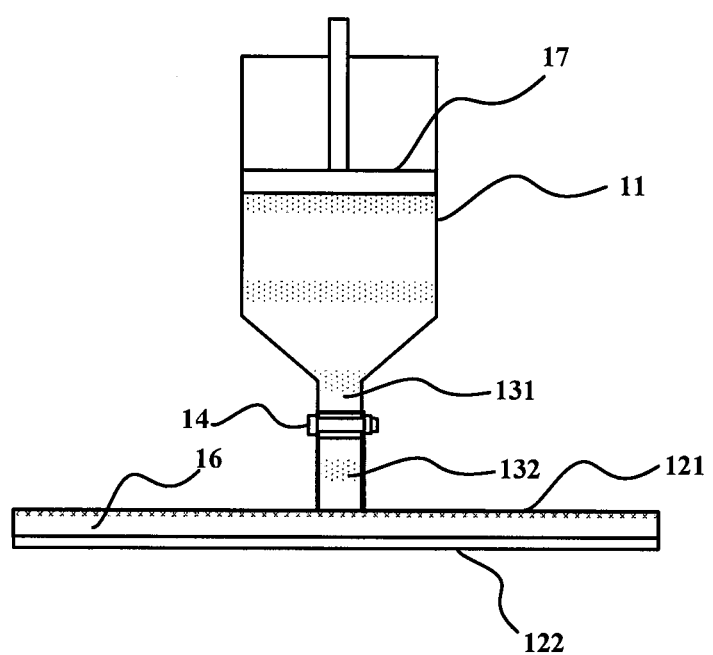
FIG. 7 is a front structural schematic view of a seal agent coating device of a fifth embodiment of this disclosure.

As shown in FIG. 7, in this embodiment, the exterior of the nozzle cavity 121 is configured with a heating muff 16. The heating muff 16 can heat the seal agent within the nozzle cavity 121, thereby reducing the viscosity of the seal agent, increasing fluidity of the seal agent, and being favorable for rupture of residual bubbles in the seal agent. The use of the design of this solution can reduce the phenomenon of kisscoating and breakcoating in the process of seal agent coating, thereby ensuring the coating quality.

Apparently, the skilled person in the art can make various modifications and variants to this disclosure without departing from the spirit and scope of this disclosure. In this way, provided that these modifications and variants of this disclosure belong to the scopes of the claims and equivalent technologies thereof, this disclosure also intends to cover these modifications and variants.

The invention claimed is:

1. A seal agent coating device, comprising: a storage cavity, a nozzle, a connecting duct and a power driven component,
   wherein the nozzle comprises a nozzle cavity and a mouth, the mouth being located at a lower part of the nozzle cavity and matching with a shape of the seal agent coating area of the substrate; the connecting duct interconnects the storage cavity and the nozzle cavity; the power driven component is configured to squeeze the seal agent in the storage cavity into the nozzle cavity via the connecting duct, thereby squeezing it out via the mouth, and
   wherein the nozzle is a frame shaped nozzle, at least one pair of opposite frame borders of the frame shaped nozzle are length adjustable frame borders.

2. The seal agent coating device as claimed in claim 1, wherein the connecting duct comprises an upper duct and a lower duct, the upper duct is connected with the storage cavity, the lower duct is connected with the nozzle cavity, the upper duct and the lower duct are detachably connected through a fastener.

3. The seal agent coating device as claimed in claim 2, wherein the lower duct comprises several branch ducts respectively connected with the nozzle cavity.

4. The seal agent coating device as claimed in claim 3, wherein the branch ducts are horizontally or obliquely arranged.

5. The seal agent coating device as claimed in claim 4, wherein the nozzle has a shrink mouth structure, a sectional shape of the nozzle cavity comprises an inverted triangle or an inverted peach shape.

6. The seal agent coating device as claimed in claim 5, wherein the power driven component comprises a piston arranged in the storage cavity, or the power driven component comprises a charging pipe for charging gas into a cavity part of the storage cavity.

7. The seal agent coating device as claimed in claim 3, wherein an on-off valve is arranged on at least one of the branch ducts.

8. The seal agent coating device as claimed in claim 7, wherein the nozzle has a shrink mouth structure, a sectional shape of the nozzle cavity comprises an inverted triangle or an inverted peach shape.

9. The seal agent coating device as claimed in claim 2, wherein the nozzle has a shrink mouth structure, a sectional shape of the nozzle cavity comprises an inverted triangle or an inverted peach shape.

10. The seal agent coating device as claimed in claim 9, wherein the power driven component comprises a piston arranged in the storage cavity, or the power driven component comprises a charging pipe for charging gas into a cavity part of the storage cavity.

11. The seal agent coating device as claimed in claim 3, wherein the nozzle has a shrink mouth structure, a sectional shape of the nozzle cavity comprises an inverted triangle or an inverted peach shape.

12. The seal agent coating device as claimed in claim 11, wherein the power driven component comprises a piston arranged in the storage cavity, or the power driven component comprises a charging pipe for charging gas into a cavity part of the storage cavity.

13. The seal agent coating device as claimed in claim 1, wherein
the length adjustable frame border comprises a first frame border portion, a second frame border portion and a transitional connecting portion, the first frame border portion and the second frame border portion are telescopically connected with two ends of the transitional connecting portion respectively, or
the length adjustable frame border comprises a first frame border portion and a second frame border portion, the first frame border portion is telescopically connected with the second frame border portion.

14. The seal agent coating device as claimed in claim 13, wherein the nozzle has a shrink mouth structure, a sectional shape of the nozzle cavity comprises an inverted triangle or an inverted peach shape.

15. The seal agent coating device as claimed in claim 1, wherein an exterior of the nozzle cavity is configured with a heating muff.

16. The seal agent coating device as claimed in claim 15, wherein the nozzle has a shrink mouth structure, the sectional shape of the nozzle cavity comprises an inverted triangle or an inverted peach shape.

17. The seal agent coating device as claimed in claim 1, wherein the nozzle has a shrink mouth structure, a sectional shape of the nozzle cavity comprises an inverted triangle or an inverted peach shape.

18. The seal agent coating device as claimed in claim 17, wherein the power driven component comprises a piston arranged in the storage cavity, or the power driven component comprises a charging pipe for charging gas into a cavity part of the storage cavity.

* * * * *